(12) United States Patent
Rame et al.

(10) Patent No.: US 11,873,543 B2
(45) Date of Patent: Jan. 16, 2024

(54) NICKEL-BASED SUPERALLOY HAVING HIGH MECHANICAL AND ENVIRONMENTAL STRENGTH AT HIGH TEMPERATURES AND LOW DENSITY

(71) Applicant: SAFRAN, Paris (FR)

(72) Inventors: Jérémy Rame, Moissy-Cramayel (FR); Edern Menou, Moissy-Cramayel (FR)

(73) Assignee: SAFRAN, Paris (FR)

( * ) Notice: Subject to any disclaimer, the term of this patent is extended or adjusted under 35 U.S.C. 154(b) by 189 days.

(21) Appl. No.: 17/425,908

(22) PCT Filed: Jan. 15, 2020

(86) PCT No.: PCT/FR2020/050052
§ 371 (c)(1),
(2) Date: Jul. 26, 2021

(87) PCT Pub. No.: WO2020/157406
PCT Pub. Date: Aug. 6, 2020

(65) Prior Publication Data
US 2022/0119924 A1     Apr. 21, 2022

(30) Foreign Application Priority Data
Jan. 31, 2019 (FR) .................................... 1900915

(51) Int. Cl.
*C22C 19/05*  (2006.01)
*F01D 5/28*  (2006.01)

(52) U.S. Cl.
CPC .............. *C22C 19/057* (2013.01); *F01D 5/28* (2013.01); *F05D 2240/12* (2013.01); *F05D 2300/175* (2013.01)

(58) Field of Classification Search
CPC .................................. C22C 19/057; C22F 1/10
See application file for complete search history.

(56) References Cited

U.S. PATENT DOCUMENTS

| 4,719,080 A | 1/1988 | Duhl et al. |
| 2003/0041930 A1 * | 3/2003 | DeLuca ................ C22C 19/056 420/443 |
| 2011/0052443 A1 | 3/2011 | Hanlon et al. |

FOREIGN PATENT DOCUMENTS

| EP | 0 971 041 A1 | 1/2000 |
| FR | 3 073 526 | 5/2019 |
| WO | WO 94/00611 A1 | 1/1994 |
| WO | WO 02/22901 A1 | 3/2002 |
| WO | WO 02/070764 A1 | 9/2002 |
| WO | WO 2018/078269 A1 | 5/2018 |
| WO | WO 2019/097163 A1 | 5/2019 |

OTHER PUBLICATIONS

International Search Report as issued in International Patent Application No. PCT/FR2020/050052, dated May 12, 2020.

\* cited by examiner

*Primary Examiner* — Jessee R Roe
(74) *Attorney, Agent, or Firm* — Pillsbury Winthrop Shaw Pittman LLP

(57) ABSTRACT

A nickel-based superalloy includes, in weight percent, 5.9 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance being nickel and unavoidable impurities.

14 Claims, No Drawings

NICKEL-BASED SUPERALLOY HAVING HIGH MECHANICAL AND ENVIRONMENTAL STRENGTH AT HIGH TEMPERATURES AND LOW DENSITY

CROSS-REFERENCE TO RELATED APPLICATIONS

This application is the U.S. National Stage of PCT/FR2020/050052, filed Jan. 15, 2020, which in turn claims priority to French patent application number 1900915 filed Jan. 31, 2019. The content of these applications are incorporated herein by reference in their entireties.

TECHNICAL FIELD

The present invention relates to the general field of nickel-based superalloys for turbomachinery, in particular for vanes, also called distributors or rectifiers, or blades, or ring segments.

PRIOR ART

Nickel-based superalloys are generally used for the hot parts of turbomachinery, i.e., the parts of turbomachinery downstream of the combustion chamber.

The main advantages of nickel-based superalloys are that they combine both high creep resistance at temperatures comprised between 650° C. and 1200° C. and resistance to oxidation and corrosion.

The high-temperature performance is mainly due to the microstructure of these materials, which is composed of a γ-Ni matrix of face-centered cubic (FCC) crystal structure and ordered γ'-$Ni_3Al$ hardening precipitates of L12 structure.

Some grades of nickel-based superalloys are used for the manufacture of single-crystal parts.

The document filed on 14 Nov. 2017 under the number FR1760675 and the document filed on 14 Nov. 2018 under the number PCT/FR2018/052840 are known, which disclose a nickel-based superalloy to improve the mechanical characteristics of the superalloy compared with existing superalloys.

Compared with the superalloy disclosed in the document filed under number FR1760675 and the document filed under number PCT/FR2018/052840, the aim is to reduce the density of the superalloy. Moreover, another aim in relation to these documents is to simplify the implementation of treatments that can be performed on the superalloy, and in particular heat treatments. Finally, another aim is to improve the microstructural stability at temperature.

DISCLOSURE OF THE INVENTION

The present invention therefore has as an objective to provide nickel-based superalloy compositions that achieve the above aims.

According to a first aspect, the invention provides a nickel-based superalloy comprising, in weight percent, 5.9 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance consisting of nickel and unavoidable impurities.

A nickel-based alloy is defined as an alloy with a majority of nickel by weight.

Unavoidable impurities are defined as elements not intentionally added to the composition but contributed with other elements. Among unavoidable impurities, particular mention may be made of carbon (C) or sulfur (S).

The nickel-based superalloy in accordance with the invention has good microstructural stability at temperature, thus enabling high mechanical properties to be obtained at temperature. In particular, the superalloy is free of topologically close-packed (TCP) phase.

The nickel-based superalloy in accordance with the invention provides a density of less than 8.75 g·cm$^{-3}$.

The nickel-based superalloy in accordance with the invention makes it possible to obtain a difference between the solvus temperature of the γ' precipitates and the solidus temperature of at least 7.5° C., thus simplifying the implementation of heat treatment.

The nickel-based superalloy in accordance with the invention has good corrosion resistance and oxidation resistance.

The nickel-based superalloy in accordance with the invention reduces the susceptibility to casting defect formation.

According to a possible alternative, the superalloy may comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance consisting of nickel and unavoidable impurities.

According to a possible alternative, the superalloy may comprise, in weight percent, 5.9 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance consisting of nickel and unavoidable impurities.

Furthermore, the superalloy may comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance consisting of nickel and unavoidable impurities.

According to a possible alternative, the superalloy may also comprise, in weight percent, 6.1 to 6.5% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance consisting of nickel and unavoidable impurities.

According to a possible alternative, the superalloy may comprise, in weight percent, 6.1 to 6.5% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.8 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 5% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.6 to 7.9% tantalum, 0.35 to 0.55% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.8 to 7.9% tantalum, 0.35 to 0.55% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.5% rhenium, 7.8 to 7.9% tantalum, 0.35 to 0.55% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.3% rhenium, 7.8 to 7.9% tantalum, 0.35 to 0.55% titanium, 3.4 to 3.8% tungsten, 0 to 0.1% silicon, the balance consisting of nickel and unavoidable impurities.

According to a possible alternative, the superalloy may comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.3% rhenium, 7.8 to 7.9% tantalum, 0.35 to 0.55% titanium, 3.4 to 3.8% tungsten, the balance consisting of nickel and unavoidable impurities.

According to a possible alternative, the superalloy may comprise, in weight percent, 6.2% aluminum, 9.75% cobalt, 4.6% chromium, 0.14% hafnium, 0.5% molybdenum, 4.1% rhenium, 7.9% tantalum, 0.45% titanium, 3.6% tungsten, the balance consisting of nickel and unavoidable impurities According to a possible feature, the superalloy comprises a sulfur content of less than or equal to 2 ppm by weight, preferably less than or equal to 1 ppm by weight, and even more preferentially less than or equal to 0.5 ppm by weight.

According to a second aspect, the invention provides a nickel-based superalloy turbomachinery part according to any of the preceding features.

The part can be an element of an aircraft turbomachinery turbine, for example a high-pressure turbine or a low-pressure turbine, or a compressor element, and in particular a high-pressure compressor.

According to an additional feature, the turbine or compressor part may be a blade, said blade may be a moving blade or a vane, or a ring sector.

According to another feature, the turbomachinery part is single-crystal, preferably with a crystal structure oriented along a crystallographic direction <001>.

According to a third aspect, the invention proposes a process for manufacturing a nickel-based superalloy turbomachinery part according to any one of the preceding features by casting.

According to an additional feature, the process comprises a directional solidification step to form a single-crystal part.

DESCRIPTION OF THE EMBODIMENTS

The superalloy in accordance with the invention comprises a nickel base with associated major additive elements.

Major addition elements comprise: cobalt Co, chromium Cr, molybdenum Mo, tungsten W, aluminum Al, tantalum Ta, titanium Ti, and rhenium Re.

The superalloy may also comprise minor additive elements, which are additive elements whose maximum percentage in the superalloy does not exceed 1% by weight.

Minor additive elements comprise: hafnium Hf and silicon Si.

The nickel-based superalloy comprises, in weight percent, 5.9 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance consisting of nickel and unavoidable impurities.

The nickel-based superalloy may also advantageously comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance being nickel and unavoidable impurities.

The nickel-based superalloy may also advantageously comprise, in weight percent, 5.9 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

The nickel-based superalloy may also advantageously comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

The nickel-based superalloy may also advantageously comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, the balance being nickel and unavoidable impurities.

The superalloy may also advantageously comprise, in weight percent, 6.1 to 6.5% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

The superalloy may also advantageously comprise, in weight percent, 6.1 to 6.3% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

The superalloy may also advantageously comprise, in weight percent, 6.1 to 6.5% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance being nickel and unavoidable impurities.

The superalloy may also advantageously comprise, in weight percent, 6.1 to 6.3% aluminum, 9.5 to 10.5% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance being nickel and unavoidable impurities.

Advantageously, the superalloy may comprise, in weight percent, 6.1 to 6.5% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance consisting of nickel and unavoidable impurities.

Advantageously, the superalloy may comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance consisting of nickel and unavoidable impurities.

The superalloy may also comprise, in weight percent, 6.1 to 6.3% aluminum, 9.5 to 10% cobalt, 4 to 5% chromium, 0.1 to 0.2% hafnium, 0.3 to 0.7% molybdenum, 3.7 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4 to 5% chromium, 0.1 to 0.2% hafnium, 0.3 to 0.7% molybdenum, 3.8 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4 to 5% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 5% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.6 to 7.9% tantalum, 0.3 to 0.6% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.6 to 7.9% tantalum, 0.35 to 0.55% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.8 to 7.9% tantalum, 0.35 to 0.55% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.5% rhenium, 7.8 to 7.9% tantalum, 0.35 to 0.55% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.3% rhenium, 7.8 to 7.9% tantalum, 0.35 to 0.55% titanium, 3.4 to 3.8% tungsten, 0 to 0.1% silicon, the balance consisting of nickel and unavoidable impurities.

The superalloy may also comprise, in weight percent, 6.1 to 6.3% aluminum, 9.5 to 10% cobalt, 4.5 to 4.7% chromium, 0.1 to 0.2% hafnium, 0.4 to 0.6% molybdenum, 3.8 to 4.3% rhenium, 7.8 to 7.9% tantalum, 0.35 to 0.55% titanium, 3.4 to 3.8% tungsten, the balance consisting of nickel and unavoidable impurities.

The superalloy may also comprise, in weight percent, 6.2% aluminum, 9.75% cobalt, 4.6% chromium, 0.14% hafnium, 0.5% molybdenum, 4.1% rhenium, 7.9% tantalum, 0.45% titanium, 3.6% tungsten, the balance consisting of nickel and unavoidable impurities.

Cobalt, chromium, tungsten, molybdenum and rhenium are mainly involved in the hardening of the γ phase, the austenitic matrix of FCC structure.

Aluminum, titanium, and tantalum promote the precipitation of the γ' phase, the hardening $Ni_3$(Al, Ti, Ta) phase with an $L1_2$ ordered cubic structure.

Furthermore, rhenium slows down the diffusive processes and limits the coalescence of the γ' phase, thus improving the creep resistance at high temperature. However, the rhenium content should not be too high in order not to negatively impact the mechanical properties of the superalloy part.

The refractory elements molybdenum, tungsten, rhenium and tantalum also slow down the diffusion-controlled mechanisms, thus improving the creep resistance of the superalloy part.

In addition, chromium and aluminum improve resistance to oxidation and corrosion at high temperatures, especially around 900° C. for corrosion and around 1100° C. for oxidation.

The addition of silicon and hafnium also optimizes the hot oxidation resistance of the superalloy by increasing the adhesion of the $Al_2O_3$ alumina layer that forms on the surface of the superalloy at high temperature in an oxidizing environment.

Furthermore, chromium and cobalt help to decrease the γ' solvus temperature of the superalloy.

Cobalt is an element chemically related to nickel that partially substitutes for nickel to form a solid solution in the γ phase, thereby strengthening the γ matrix, reducing the susceptibility to precipitation of topologically close-packed phases, in particular the μ, P, R, and σ phases, and Laves phases, and reducing the susceptibility to secondary reaction zone (SRZ) formation.

Furthermore, a very low sulfur content of the nickel-based superalloy makes it possible to significantly increase the resistance to oxidation and corrosion when hot, as well as the resistance to spalling of the thermal barrier when the superalloy is used to form a part coated with a thermal barrier (for example a turbine blade). By very low sulfur content is meant here a content of less than or equal to 2 ppm by weight, preferably less than or equal to 1 ppm by weight, and even more preferentially less than or equal to 0.5 ppm by weight. Such a sulfur concentration can be obtained by preparing a low-sulfur mother liquor or by using a post-casting desulfurization process. Such a sulfur concentration can also be obtained by preparing a low-sulfur mother liquor and then using a post-casting desulfurization process.

Such a superalloy composition allows to improve the mechanical properties at high temperature (650° C.-1200° C.) of the parts manufactured from said superalloy.

In addition, such a superalloy composition allows for improved manufacturing by reducing the risk of defect formation during the manufacture of the part, and in particular the formation of "freckle"-type parasitic grains during directional solidification.

Indeed, the superalloy composition reduces the susceptibility of the part to the formation of "freckle" parasitic grains. The susceptibility of the part to the formation of "freckle" parasitic grains is evaluated using the criterion of Konter, denoted NFP, which is given by the following equation (1):

[Math. 1]

$$NFP = \frac{[\% \text{ Ta} + 1.5\% \text{ Hf} + 0.5\% \text{ Mo} - 0.5\% \text{ Ti}]}{[\% \text{ W} + 1.2 \text{ Re}]} \quad (1)$$

Where % Ta is the tantalum content of the superalloy, in weight percent; where % Hf is the hafnium content of the superalloy, in weight percent; where % Mo is the molybdenum content of the superalloy, in weight percent; where % Ti is the titanium content in the superalloy, in weight percent; where % W is the tungsten content in the superalloy, in weight percent; and where % Re is the rhenium content in the superalloy, in weight percent.

The superalloy composition makes it possible to obtain an NFP parameter greater than or equal to 0.7, a value above which the formation of "freckle" parasitic grains is greatly reduced.

Furthermore, such a superalloy composition allows for a reduced density, in particular a density below 8.4 g/cm³.

Table 1 below shows the composition, in weight percent, of three examples of superalloys in accordance with the invention, Examples 1 to 3, as well as commercial or reference superalloys, Examples 4 to 9. Example 4 corresponds to the AM1 superalloy, Example 5 corresponds to the PWA 1484 superalloy, Example 6 corresponds to the CMSX-4 superalloy, Example 7 corresponds to the CMSX-4 Plus® Mod C superalloy, Example 8 corresponds to René® N6 superalloy, and Example 9 corresponds to CMSX-10 K® superalloy.

TABLE 1

| Alloys | Ni | Al | Ta | Ti | Co | Cr | Mo | W | Re | Hf | Others |
|---|---|---|---|---|---|---|---|---|---|---|---|
| Ex 1 | Balance | 6.2 | 7.9 | 0.45 | 9.75 | 4.6 | 0.5 | 3.6 | 4.1 | 0.17 | |
| Ex 2 | Balance | 6.2 | 7.9 | 0.45 | 9.75 | 4.6 | 0.5 | 3.6 | 4.1 | 0.12 | |
| Ex 3 | Balance | 6.2 | 7.9 | 0.45 | 9.75 | 4.6 | 0.5 | 3.6 | 4.1 | 0.12 | Si 0.1 |
| Ex 4 | Balance | 5.3 | 8 | 1.2 | 6.5 | 7.5 | 2 | 5.5 | 0 | 00.5 | |
| Ex 5 | Balance | 5.65 | 8.7 | 0 | 10 | 5 | 1.9 | 5.9 | 3 | 0.1 | |
| Ex 6 | Balance | 5.6 | 6.5 | 1 | 9.6 | 6.6 | 0.6 | 6.4 | 3 | 0.1 | |
| Ex 7 | Balance | 5.7 | 8 | 0.85 | 10 | 3.5 | 0.6 | 6 | 4.8 | 0.1 | |
| Ex 8 | Balance | 6 | 7.5 | 0 | 12.2 | 4.4 | 1.1 | 5.7 | 5.3 | 0.03 | 0.05 C + 0.004 B + 0.01 Y |
| Ex 9 | Balance | 5.7 | 8 | 0.2 | 3 | 2 | 0.4 | 5 | 6 | 0.15 | 0.1 Nb + 0.01 Si |

Table 2 gives estimated characteristics of the superalloys listed in Table 1. The characteristics given in Table 2 are density, different transformation temperatures (solvus, solidus and liquidus), mole fraction of the γ' phase at 700° C., 900° C., at 1050° C. and at 1200° C., mole fraction of the topologically close-packed (TPC) phases at 900° C. and at 1050° C.

TABLE 2

| Alloys | Density | Transformation temperatures (° C.) | | | γ' phase mole fraction (% mol) | | | | TCP volume fraction (% mol) | |
|---|---|---|---|---|---|---|---|---|---|---|
| | | Solvus | Solidus | Liquidus | 700° C. | 900° C. | 1050° C. | 1200° C. | 900° C. | 1050° C. |
| Ex 1 | 8.73 | 1317 | 1326 | 1399 | 75 | 68 | 57 | 34 | 0 | 0 |
| Ex 2 | 8.73 | 1313 | 1332 | 1399 | 75 | 68 | 57 | 33 | 0 | 0 |
| Ex 3 | 8.74 | 1315 | 1327 | 1397 | 74 | 67 | 57 | 34 | 0.4 | 0 |
| Ex 4 | 8.63 | 1291 | 1301 | 1366 | 69 | 63 | 53 | 29 | 0.1 | 0 |
| Ex 5 | 8.89 | 1295 | 1337 | 1394 | 77 | 66 | 50 | 26 | 0.2 | 0 |
| Ex 6 | 8.76 | 1270 | 1310 | 1385 | 70 | 63 | 52 | 23 | 1.1 | 0 |
| Ex 7 | 8.95 | 1308 | 1319 | 1398 | 73 | 68 | 58 | 35 | 1.6 | 0.8 |
| Ex 8 | 8.92 | 1285 | 1335 | 1400 | 75 | 66 | 51 | 25 | 1.7 | 0.4 |
| Ex 9 | 8.96 | 1372 | 1382 | 1400 | 69 | 68 | 61 | 46 | 0.5 | 0.4 |

The γ' phase mole fractions of the alloys of the invention (Examples 1 to 3) are very high at 1200° C., about 34% mol, reflecting high stability of the hardening precipitates, which ensures high mechanical properties at temperature. The mole fractions of the superalloys in accordance with the invention are higher than those of the reference superalloys of Examples 4, 5, 6 and 8 and similar to that of the superalloy of Example 7, the superalloy of Example 7 being known for its very good creep properties at high temperature.

The volume fraction of embrittling (TPC) phases which is present in the alloys in accordance with the invention (Examples 1 to 3) is negligible or zero at 900° C., and zero at 1050° C., contrary to the reference alloys of Examples 7, 8 and 9, thus reflecting a high stability of the microstructure at the target temperatures of use.

Table 3 gives estimated characteristics of the superalloys listed in Table 1. The characteristics given in Table 3 are the activity of chromium in the γ phase at 900° C., and the activity of aluminum in the γ phase at 1100° C. The activities of chromium and aluminum in the γ matrix are an indication of the corrosion and oxidation resistance, the higher the chromium activity and aluminum activity in the matrix, the higher the corrosion and oxidation resistance.

TABLE 3

| Alloys | γ phase Cr activity 900° C. | γ phase Al activity 1100° C. |
|---|---|---|
| Ex 1 | 1.92E-3 | 1.10E-07 |
| Ex 2 | 1.89E-3 | 1.08E-07 |
| Ex 3 | 1.91E-3 | 1.15E-07 |
| Ex 4 | 3.78E-3 | 9.96E-08 |
| Ex 5 | 2.19E-3 | 1.20E-07 |
| Ex 6 | 3.05E-3 | 1.28E-07 |
| Ex 7 | 1.51E-3 | 1.02E-07 |
| Ex 8 | 1.80E-3 | 1.48E-07 |
| Ex 9 | 5.18E-4 | 4.22E-08 |

The superalloys in accordance with the invention (Examples 1 to 3) have higher chromium activities at 900° C. than the reference alloys of Examples 5 and 7, which are known to have poor corrosion resistance.

As illustrated in Tables 2 and 3, the superalloys in accordance with the invention have mechanical properties at least equivalent to and even superior at high temperatures to the alloys of the prior art, while exhibiting lower density and superior resistance to corrosion and oxidation.

The properties given in Tables 2 and 3 are estimated using the CALPHAD (CALculation of PHAse Diagrams) method.

The nickel-based superalloy part can be made by casting.

The casting of the part is made by melting the superalloy, the liquid superalloy being poured into a mold to be cooled and solidified. The casting of the part can for example be made by the lost wax technique, in particular to make a blade.

Furthermore, in order to produce a single-crystal part, in particular a blade, the process can comprise a directional solidification step. The directional solidification is performed by controlling the thermal gradient and the solidification rate of the superalloy, and by introducing a single-crystal grain or by using a grain selector, in order to avoid the appearance of new grains in front of the solidification front.

In particular, directional solidification can allow the manufacture of a single-crystal blade whose crystal structure is oriented along a crystallographic direction <001> that is parallel to the longitudinal direction of the blade, i.e., along the radial direction of the turbomachine, such an orientation providing better mechanical properties.

The invention claimed is:

1. A nickel-based superalloy comprising, in weight percent, 6.1 to 6.3% aluminum, 9.5 to 10.5% cobalt, 4.5 to 4.7% chromium, 0.1 to 0.2% hafnium, 0.3 to 0.7% molybdenum, 3.7 to 4.5% rhenium, 7.5 to 8.5% tantalum, 0.2 to 0.7% titanium, 3.2 to 4% tungsten, 0 to 0.1% silicon, the balance consisting of nickel and unavoidable impurities.

2. The superalloy as claimed in claim 1, wherein said superalloy comprises, in weight percent, 6.1 to 6.3% aluminum, 9.5 to 10.5% cobalt, 4.5 to 4.7% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

3. The superalloy as claimed in claim 1, wherein the superalloy comprises a sulfur content of less than or equal to 2 ppm by weight.

4. A turbomachinery part made of nickel-based superalloy as claimed in claim 1.

5. The part as claimed in claim 4, wherein said part is single-crystal.

6. The superalloy as claimed in claim 1, wherein said superalloy comprises, in weight percent, 6.1 to 6.3% aluminum, 9.5 to 10.5% cobalt, 4.5 to 4.7% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance consisting of nickel and unavoidable impurities.

7. The superalloy as claimed in claim 6, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

8. The superalloy as claimed in claim 7, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance being nickel and unavoidable impurities.

9. The superalloy as claimed in claim 7, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.7 to 4.5% rhenium, 7.5 to 7.9% tantalum, 0.2 to 0.7% titanium, 3.2 to 4% tungsten, 0 to 0.1% silicon, the balance being nickel and unavoidable impurities.

10. The superalloy as claimed in claim 9, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.7 to 4.5% rhenium, 7.5 to 7.9% tantalum, 0.3 to 0.6% titanium, 3.2 to 4% tungsten, 0 to 0.1% silicon, the balance being nickel and unavoidable impurities.

11. The superalloy as claimed in claim 10, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.7 to 4.5% rhenium, 7.5 to 7.9% tantalum, 0.3 to 0.6% titanium, 3.4 to 3.8% tungsten, 0 to 0.1% silicon, the balance consisting of nickel and unavoidable impurities.

12. The superalloy as claimed in claim 11, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.5 to 7.9% tantalum, 0.3 to 0.6% titanium, 3.4 to 3.8% tungsten, 0 to 0.1% silicon, the balance being nickel and unavoidable impurities.

13. The superalloy as claimed in claim 12, wherein said superalloy comprises, in weight percent, 6.1 to 6.3% aluminum, 9.5 to 10% cobalt, 4.5 to 4.7% chromium, 0.1 to 0.2% hafnium, 0.3 to 0.7% molybdenum, 3.8 to 4.5% rhenium, 7.6 to 7.9% tantalum, 0.35 to 0.55% titanium, 3.4 to 3.8% tungsten, 0 to 0.1% silicon, the balance consisting of nickel and unavoidable impurities.

14. A process for manufacturing a turbomachinery part made of nickel-based superalloy as claimed in claim 1 by casting.

\* \* \* \* \*